United States Patent [19]

Balla

[11] 4,060,443
[45] Nov. 29, 1977

[54] DEVICE FOR THE HEAT-SEALING OF THERMOPLASTIC MATERIAL OR PAPER MATERIAL COATED WITH THERMOPLASTICS

[75] Inventor: Gyula Balla, Malmo, Sweden

[73] Assignee: Tetra Pak International AB, Lund, Sweden

[21] Appl. No.: 353,376

[22] Filed: Apr. 23, 1973

[30] Foreign Application Priority Data

May 23, 1972 Sweden ................................ 6722/72

[51] Int. Cl.$^2$ .......................... H05B 7/06; H05B 9/04
[52] U.S. Cl. .............................. 156/380; 93/DIG. 1; 156/273; 219/10.81
[58] Field of Search .............. 156/380, 273, 272, 274; 219/6.5, 9.5, 10.43, 10.53, 10.81, 10.41; 93/DIG. 1

[56] References Cited

U.S. PATENT DOCUMENTS

| 2,506,626 | 5/1950 | Zottu | 219/6.5 |
| 3,109,080 | 10/1963 | Pungs et al. | 219/10.53 |
| 3,472,721 | 10/1969 | Abramson et al. | 156/380 |

Primary Examiner—Charles E. Van Horn
Assistant Examiner—M. G. Wityshyn
Attorney, Agent, or Firm—Earle R. Marden; H. William Petry

[57] ABSTRACT

A device to heat seal at least two thermoplastic layers using heat generated by the dielectric loss from a high frequency generator.

6 Claims, 4 Drawing Figures

DEVICE FOR THE HEAT-SEALING OF THERMOPLASTIC MATERIAL OR PAPER MATERIAL COATED WITH THERMOPLASTICS

The present invention relates to a device for the heat-sealing of thermoplastic material or paper material coated with thermoplastics with utilization of the heat which is generated in the material owing to the dielectric losses arising when the material is subjected to a high-frequency electric field.

In packaging techniques, packing materials consisting of thermoplastics or of paper coated with thermoplastics are frequently used on the one hand because of the liquid tightness and resistance to grease and moisture of the thermoplastic material and on the other hand because the thermoplastic material can be heat sealed. The layers of thermoplastic material are placed against one another and are fused together in a homogeneous joint by applying heat to the sealing region at the same time as the material layers are pressed against one another. When thicker packing material (e.g. laminate combinations with a great number of layers or laminate combinations, where the basis consists of a relatively thick layer of paper or cardboard, is to be sealed) it is difficult to supply sufficient heat for the sealing since the heat for the sealing of material layers placed on one another has to be supplied from the outside of the packing material and be conducted through the whole material to the inner thermoplastic sealing layer to melt it for sealing. Since in most modern packing machines a short sealing time is required, it is not suitable to supply the sealing heat through the packing material by applying the heated sealing jaws against the outside of the packing material, but it will be endeavored instead to generate the heat in the packing material itself or in a part of the packing material which is situated as near to the sealing layer as possible.

It is relatively simple in packing material containing a metal foil layer to achieve this by inducing, by means of coils which are inserted in the sealing jaws, induction currents in the metal foil layer, which is heated up, whereupon the heated metal foil layer, through conduction, transmits heat to the adjacent material layers, one of which is assumed to be the thermoplastic sealing layer.

It is expensive, however, to introduce an aluminum foil layer into a packing material simply for making the same sealable by induction currents, and it has been considered instead to generate heat in the insulating packing material through the dielectric losses which arise when the packing material is subjected to a very high frequency electric field.

To obtain the required sealing heat in a short time very high frequencies, of the order of magnitude of 300-600 MHz, are required for generating the dielectric losses and it was found to be difficult to obtain an even distribution of heat along the whole sealing area, owing to the fact that the wavelengths at such high frquencies only slightly exceed the desired sealing lengths, whereby nodal points are obtained along the path of sealing where no heat is generated. These disadvantages can be overcome, however, with a device in accordance with the invention, which device is characterized by an outer metal body presenting a straight or curved space limited by at least two sidewalls and an end wall of metal attached at the one end to the said space which connects the side walls to one another. An inner metal plate is arranged centrally inside the outer body and is metallically connected to and fixed into the central portion of the end wall of the said body. An element for the connection of the inner metal plate to the central conductor of a coaxial cable connects the device to a high frequency generator, and to the shield conductor of the coaxial cable to the said outer body.

The invention is characterized further by a metal yoke which at opposite edge regions has contacts intended to be connected galvanically to opposite parts of the metal body at the open end of the same. The yoke is designed so that the material intended for heat-sealing can be accommodated between the open end of the metal body and the yoke.

In the following will be described a particularly suitable embodiment of the invention with reference to the enclosed schematic drawing, in which.

Figure 1:
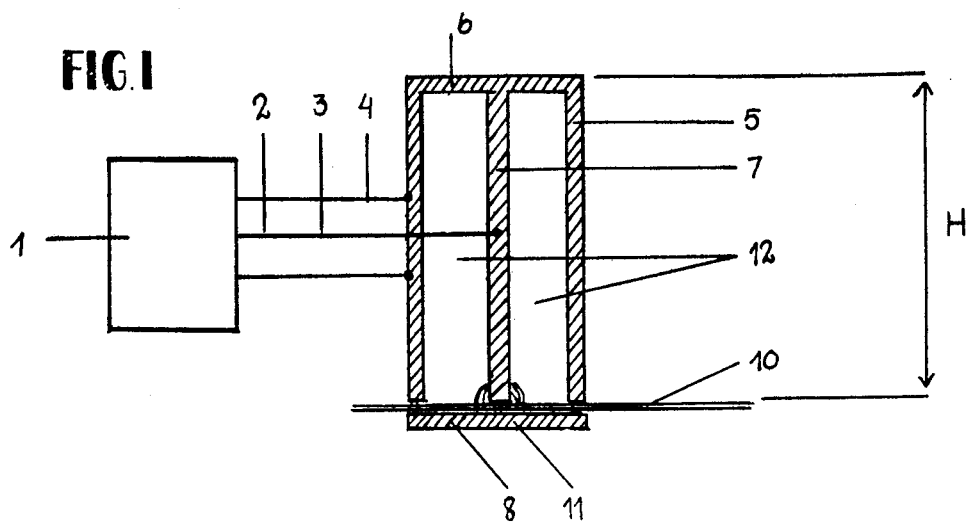
FIG. 1 shows a cross-section of the device.

In FIG. 1 is shown schematically how a high frequency generator with a frequency of the order of magnitude of 200-800 MHz by means of a coaxial cable 2, consisting of a central conductor 3 and an outer shield 4, feeds a cavity resonator comprising a cavity 12, which is limited by the outer metal sidewalls 5 and the end wall 6. The outer parallel sidewalls 5 form a straight or curved cylinder, and in the present case where it is desired to have a sealing element which gives a linear seal, it is suitable to design the side walls 5 and the end wall 6 so as to form together a container with a long and narrow, substantially rectangular cross-section. In the metal end wall 6 furthermore an inner plate 7 of a metallic material is fixed in such a manner, that it is located centrally in the cavity formed and is in metallic contact with the end plate 6. The central conductor 3 of the coaxial cable 2 is connected to the inner plate 7 whereas the shield conductor 4 of the coaxial cable is connected to the outer side walls 5. The material 10 intended for sealing is placed underneath the open end of the device in such a manner that the desired sealing area is located under the inner plate 7. Underneath the material 10 intended to be sealed is arranged a yoke 11, which by means of contact elements, not shown here, is in metallic contact with the outer side walls 5, while the packing material 10 forms an insulating layer between the free ends of the inner plate 7 and the yoke 11.

When a high-frequency current is generated in the generator 1 and the current is transmitted by means of the coaxial cable 2 to the device in accordance with FIG. 1, resonance phenomena arise, provided that the height of the plate 7, the length of the air gaps 12 and the distance between the inner plate 7 and the outer sides 5 of the device are matched in a suitable manner. On the assumption that resonance is attained, a strong electric field is formed between the free ends of the inner plate 7 and the yoke 11, and owing to the high frequency of the said field, namely 200-800 MHz, dielectric losses arise in the part of the packing material 10 which is located in the said high-frequency electric field, and through these losses the packing material is heated rapidly to such an extent that the thermoplastic layers applied to the packing material are made to melt, with the thermoplastic layers which are next to one another fusing together so as to form a homogeneous and firm joint, since the layers of packing material 10 intended for sealing are pressed to one another between the free edge of the inner plate 7 and the yoke 8.

Figure 2:
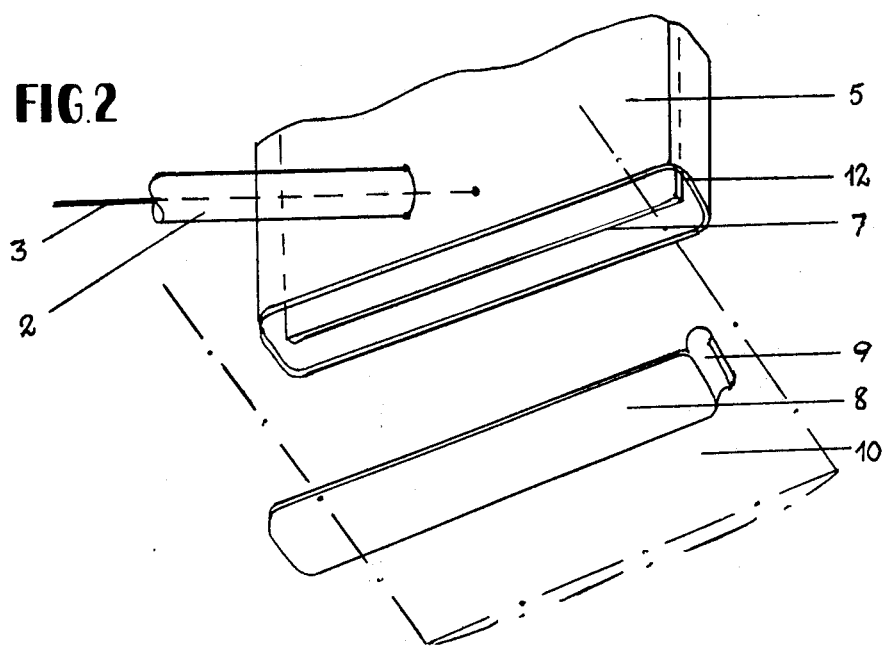
FIG. 2 shows a perspective view of the device.

In FIG. 2 is shown a perspective view of the device in accordance with FIG. 1 from which the long and narrow form can more readily be appreciated. The yoke 8 which is of metallic material, is provided with metal springs 9, which are brought into contact with the short sides of the cylinder with rectangular cross-section, which is formed by the side walls 5. The springs 9 must be withdrawable under the effect of pressure, so that they do not hinder the packing material 10 as it is being pressed between the yoke 8 and the inner plate 7. Naturally the springs 9, or any similar withdrawable device, may also be fitted on the body formed by the side walls 5, and the contact device 9 need not necessarily be in the form of springs but may consist of sliding contacts or similar elements. In FIG. 2 is shown how a flattened tube 10 of packing material, which is assumed to consist of a base layer of paper whose inside is coated with a thermoplastic material, e.g., polyethylene, is introduced underneath the free edges of the inner plate 7 in such a manner, that the yoke 8 will be located underneath the flattened tube 10. When the sealing is to be carried out, the yoke 8 and the inner plate 7 are pressed against one another while the flattened tube 10 is between them, and galvanic contact is established between the ends of the yoke 8 and the side walls of the cylindrical part 5 with the help of the contact elements 9 which, in the case shown here, consist of springs that are withdrawable under pressure. When the flattened tube of packing material is pressed between the yoke 8 and the inner plate 7, the generator 1 is cut on, as a result of which a high frequency current is fed via the coaxial cable 2 to the device which is matched to resonance at the frequency of the curent fed. A strongly concentrated electric field of a frequency corresponding to the feed current is formed then between the front edge of the inner plate 7 and the yoke, which means that the electric field will pass through the packing material of the flattened tube 10. Owing to the high frequency and the concentrated electric field a heating effect arises very rapidly because of the dielectric losses in the packing material. By virtue of heat being generated in the packing material and within a very narrow region, sufficient heat is rapidly generated for the sealing, and the temperature that is need is approximately 150° C. Owing to the fact that the heating occurs at the same time as the layers of packing material are pressed together between the yoke and the inner plate 7, the thermoplastic materials which are facing one another inside the tube are fused together within a narrow sealing region to a homogeneous and firm sealing joint.

Figure 3:
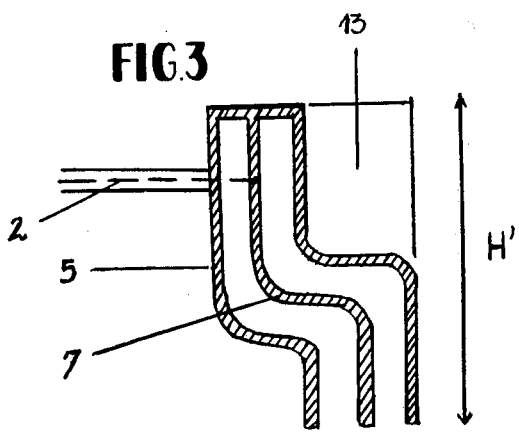
FIG. 3 shows a modification of the device for obtaining a shorter, and consequently less space requiring sealing jaw.

The height of the inner plate and the height of the air columns in the cavity 12 are among the factors which determine the dimensioning of the device to a certain frequency, and in general it can be said that the device will be the higher the lower the frequency is. In practical experiments it was found that the height of the device at a frequency of approximately 450 MHz will be approximately 150 mm. This height H of the device in accordance with FIG. 1 can be reduced, however, if the device is designed in the manner as shown in FIG. 3, where the height H' is substantially lower owing to the device being designed in S-shape, whereby it has to be ensured, however, that the outer walls of the body which form a cylinder or a tube are parallel to one another, and that the inner plate 7 is located centrally in the pipe or the cylinder 5. In FIG. 3 the device in accordance with the invention is constructed and fitted in a bar 13, which is joined to the moving mechanism of the compression jaws and thus functions only as a supporting element for the device in accordance with the invention.

Figure 4:
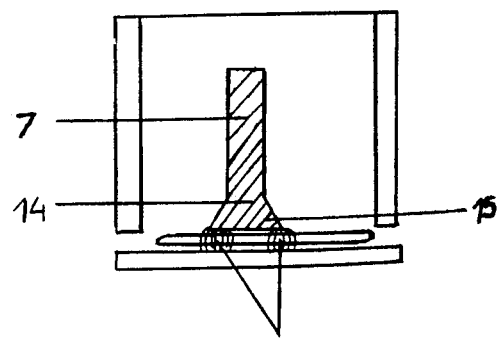
FIG. 4 shows a special form of a design of the free end of the central plate.

In FIG. 4 finally is shown a special design of the lower part 14 of the inner plate 7, which is widened and includes two projecting parts 15. By the design of the inner plate 7 in accordance with FIG. 4 two concentrated electric fields 11 at some distance from one another are obtained which means that also two sealing lines are obtained which are parallel to one another across the flattened tube of packing material 10 in FIG. 2. This is desirable in the case where the tube after filling is divided up by cutting in the sealing regions, the said cuts being located between the sealing regions, close to one another and parallel with one another, when formed by a device in accordance with FIG. 4.

It should also be mentioned that by curving of the device in accordance with FIG. 3 not only a device in S-shape, but also one in the shape of a U or an L or any other configuration can be designed, which may be considered suitable for accommodating the device in a packing machine, where sometimes a limited space is available for the sealing jaws. The device in accordance with the invention may be manufactured of different metallic materials, but copper and aluminum must be preferred owing to the good electric conductivity of the materials.

It is not absolutely necessary to design the outer body 5 as a tube, although this design does give the best result, but the outer body may also consist of two plates, which are located parallel to each other on either side of the inner plate 7, that is to say the space which is limited by the outer body 5 has no side walls in this embodiment. It is also possible to design the device so that the side walls of the outer body 5 slope against one another, but in this case care must be taken that the thickness of the inner plate 7 diminishes proportionally to the diminishing width of the cavity 12 formed by the side walls 5.

That which is claimed is:

1. A device for heat sealing at least two layers of a thermoplastic material comprising a metal body having at least two substantially parallel side walls, a first metal wall connected to said side walls, a second metal wall connected to said first wall substantially equidistant from said side walls, a coaxial cable having a central conductor, a shield conductor, said central conductor being connected to said second wall, and shield conductor being connected to one of said side walls and means connecting said coaxial cable to a high frequency generator and a metal yoke connected to and spaced from said side walls to provide a space therebetween for the passage of a web of material.

2. The device of claim 1 wherein said side walls are connected by two other side walls to form a rectangle.

3. The device of claim 1 wherein said yoke is connected to said side walls by metal springs.

4. The device of claim 1 wherein said side walls are curved to reduce the height of the device.

5. The device of claim 4 wherein said side walls are substantially S-shaped.

6. The device of claim 1 wherein the end of said second metal wall away from said first metal wall is flared.

* * * * *

UNITED STATES PATENT OFFICE
CERTIFICATE OF CORRECTION

Patent No. 4,060,443      Dated November 29, 1977

Inventor(s) Gyula Balla

It is certified that error appears in the above-identified patent and that said Letters Patent are hereby corrected as shown below:

Column 3, line 36, delete the word "curent" and substitute therefor --current--.

Column 4, line 51, delete the word "and" and substitute therefore --said--.

*Signed and Sealed this*

*Eighteenth* Day of *July 1978*

[SEAL]

Attest:

RUTH C. MASON
*Attesting Officer*

DONALD W. BANNER
*Commissioner of Patents and Trademarks*